(12) United States Patent
Lee et al.

(10) Patent No.: US 11,290,672 B2
(45) Date of Patent: Mar. 29, 2022

(54) IMAGE SENSING DEVICE AND IMAGE SENSING METHOD

(71) Applicant: Eagle Vision Tech Limited, Hong Kong (HK)

(72) Inventors: Sywe-Neng Lee, Taipei (TW); Chen-Chien Chung, New Taipei (TW)

(73) Assignee: Eagle Vision Tech Limited, Hong Kong (HK)

( * ) Notice: Subject to any disclaimer, the term of this patent is extended or adjusted under 35 U.S.C. 154(b) by 9 days.

(21) Appl. No.: 15/931,554

(22) Filed: May 13, 2020

(65) Prior Publication Data
US 2021/0021773 A1    Jan. 21, 2021

(30) Foreign Application Priority Data
Jul. 18, 2019  (TW) .................................. 108125507

(51) Int. Cl.
*H04N 5/378* (2011.01)
(52) U.S. Cl.
CPC .................................. *H04N 5/378* (2013.01)
(58) Field of Classification Search
CPC ....... H04N 5/378; H04N 5/374; H04N 5/3745
See application file for complete search history.

(56) References Cited

U.S. PATENT DOCUMENTS

| | | | | |
|---|---|---|---|---|
| 6,870,565 B1* | 3/2005 | Blerkom | ................ | H04N 5/378 348/294 |
| 2007/0076109 A1* | 4/2007 | Krymski | .................. | H04N 5/32 348/300 |
| 2011/0074994 A1* | 3/2011 | Wakabayashi | ...... | H03M 1/1023 348/302 |
| 2011/0080507 A1* | 4/2011 | Iwasa | ..................... | H04N 5/378 348/302 |

(Continued)

FOREIGN PATENT DOCUMENTS

| | | |
|---|---|---|
| CN | 103201764 | 7/2013 |
| CN | 107507591 | 12/2017 |
| TW | 201906148 | 2/2019 |

OTHER PUBLICATIONS

"Office Action of Taiwan Counterpart Application", dated Mar. 17, 2020, p. 1-p. 14.

*Primary Examiner* — Lin Ye
*Assistant Examiner* — John H Morehead, III
(74) *Attorney, Agent, or Firm* — JCIPRNET

(57) ABSTRACT

An image sensing device and an image sensing method are provided. The image sensing device comprises an image sensing array, multiple analog-to-digital converters, a multiplexer, a write controller, a memory, and a read controller. Each of pixel capturing areas of the image sensing array acquires multiple analog pixel data sequentially at the same time. Each of the analog-to-digital converters converts these analog pixel data into multiple digital pixel data. The write controller receives the digital pixel data generated by the (Continued)

analog-to-digital converters from the multiplexer, and writes the digital pixel data to the memory according to a first pixel arrangement of the digital pixel data. The read controller reads the digital pixel data from the memory according to a second pixel arrangement related to the video format, thereby generating a video signal of the video format.

12 Claims, 4 Drawing Sheets

(56) References Cited

U.S. PATENT DOCUMENTS

| | | | | |
|---|---|---|---|---|
| 2012/0008430 | A1* | 1/2012 | Tachibana | G11C 7/14 |
| | | | | 365/189.16 |
| 2013/0057744 | A1* | 3/2013 | Minagawa | H04N 5/37457 |
| | | | | 348/311 |
| 2013/0250150 | A1 | 9/2013 | Malone et al. | |
| 2014/0077986 | A1* | 3/2014 | Huang | H03M 1/12 |
| | | | | 341/172 |
| 2016/0118971 | A1* | 4/2016 | Sugiyama | H03K 5/08 |
| | | | | 345/691 |
| 2016/0360138 | A1* | 12/2016 | Meynants | H01L 27/14609 |
| 2018/0234656 | A1* | 8/2018 | Krymski | H04N 5/3742 |
| 2019/0006400 | A1* | 1/2019 | Lee | H04N 19/40 |
| 2019/0373195 | A1* | 12/2019 | Minagawa | H04N 5/378 |
| 2019/0383917 | A1* | 12/2019 | Shinozuka | G01S 7/4865 |

* cited by examiner

IMAGE SENSING DEVICE AND IMAGE SENSING METHOD

CROSS-REFERENCE TO RELATED APPLICATION

This application claims the priority benefit of Taiwan application serial no. 108125507, filed on Jul. 18, 2019. The entirety of the above-mentioned patent application is hereby incorporated by reference herein and made a part of this specification.

BACKGROUND OF THE INVENTION

1. Field of the Invention

The present disclosure relates to an image sensing technology, in particular, to an image sensing device and an image sensing method for realizing high-definition image sensing and video encoding.

2. Description of Related Art

As the image sensing technology continues to advance, the definition of images captured by image sensing systems is gradually improved today, resulting in a rapid increase in the number of pixels on image sensing elements (e.g., CMOS pixel arrays).

However, in order to achieve high resolution, the image sensing element will need to sense a greater number of pixels. The greater the number of pixels, the shorter the working time that can be allocated to each pixel on the image sensing element. Therefore, the analogy circuit design is greatly increased in difficulty, and the higher the operating frequency, the higher the noise, which has a great impact on the sensed image quality of the image sensing element. If the image sensing system is realized at a frame rate of 30 frames per second, although the pixels of scanning lines on each column can be sensed and captured at the same time, the number of columns of the image sensing element continues to increase due to the demand for a high-definition image, resulting in an insufficient working time when sensing the pixels. For example, in the case that a National Television System Committee (NTSC) standard image has resolution of 525 scanning lines, the working time of each scanning line is approximately ($\frac{1}{30}$)/525 seconds; in the case that the image has resolution of 2000 scanning lines, the working time of each scanning line is approximately ($\frac{1}{30}$)/2000 seconds. To this end, many manufacturers are looking for ways to prolong the working time of the image sensing element in sensing each scanning line in the case of high resolution.

SUMMARY OF THE INVENTION

The present disclosure provides an image sensing device and an image sensing method, which simultaneously perform signal conversion by using multiple pixel capturing areas and corresponding multiple analog-to-digital converters, and directly read digital pixel data from a memory according to a pixel arrangement of the video format, that is, a video signal of the specific video format can be quickly generated without performing complicated analog-digital signal conversion.

The image sensing device provided by the present disclosure comprises an image sensing array, multiple analog-to-digital converters, a multiplexer, a write controller, a memory, and a read controller. The image sensing array is divided into multiple pixel capturing areas. The scanning lines of each of the pixel capturing areas are the same in length, and each of the pixel capturing areas acquires multiple analog pixel data sequentially at the same time. Each of the analog-to-digital converters is coupled to each of the corresponding pixel capturing areas to convert the analog pixel data sensed from the corresponding pixel capturing area into multiple digital pixel data. The multiplexer is coupled to the output ends of the analog-to-digital converters, the write controller is coupled to the multiplexer, the memory is coupled to the write controller, and the read controller is coupled to the memory. The memory is used for temporarily storing and buffering the digital pixel data. The write controller receives the digital pixel data generated by the analog-to-digital converters from the multiplexer and writes the digital pixel data to the memory according to a first pixel arrangement related to the digital pixel data. The read controller reads the digital pixel data in the memory according to a second pixel arrangement related to the video format, thereby generating a video signal of the video format.

The image sensing method provided by the present disclosure comprises the following steps. An image is captured by an image sensing array, the image sensing array is divided into multiple pixel capturing areas, the scanning lines of each of the pixel capturing areas are the same in length, and each of the pixel capturing areas acquires multiple analog pixel data sequentially at the same time. The analog pixel data sensed by the pixel capturing area corresponding to the analog-to-digital converter is converted into multiple digital pixel data by multiple analog-to-digital converters. The digital pixel data generated by the analog-to-digital converters is received, and the digital pixel data is written to the memory according to the first pixel arrangement related to the digital pixel data. And, the digital pixel data in the memory is read according to a second pixel arrangement related to the video format, thereby generating a video signal of the video format.

The image sensing device provided by the present disclosure comprises an image sensing array, multiple analog-to-digital converters, a multiplexer, a write controller, a memory, and a read controller. The image sensing array is divided into multiple pixel capturing areas. The scanning lines of each of the pixel capturing areas are the same in length, and each of the pixel capturing areas acquires multiple analog pixel data sequentially at the same time. Each of the analog-to-digital converters is coupled to each of the corresponding pixel capturing areas to convert the analog pixel data sensed from the corresponding pixel capturing areas into multiple digital pixel data. The multiplexer is coupled to the output ends of the analog-to-digital converters. The write controller is coupled to the multiplexer, and the write controller is used for controlling the multiplexer to receive the digital pixel data. The memory is coupled to the write controller. The write controller is used for temporarily storing and buffering the digital pixel data through the memory. The read controller is coupled to the memory. The read controller is used for integrating the digital pixel data in the memory into a video signal. The adjacent pixel capturing areas acquire the analog pixel data in different sequences.

Based on the above, the image sensing device and the image sensing method according to the embodiments of the present disclosure simultaneously perform signal conversion by using multiple pixel capturing areas and corresponding multiple analog-to-digital converters so that the pixel data is in a digital form, thereby improving the work efficiency and enabling each of the pixel sensing units in the image sensing array to obtain more scanning line working time. Moreover, when reading the digital pixel data from the memory, the embodiment directly adopts the pixel arrangement related to the video format. In this way, the digital pixel data can quickly generate a video signal of the specific video format according to the pixel arrangement related to the video format, without performing complicated analog-digital signal conversion, for example, the digital pixel data do not need to be adjusted again by using devices such as "pixel sequence rearrangement" and "video encoding". Furthermore, in the embodiment, data lines of which the number is equal to the number of the pixel capturing areas are designed in the layout area occupied by each of the pixel sensing units, and only one of the data lines is connected to the corresponding pixel sensing unit, but each of the pixel sensing units is similar in physical properties (e.g., capacitive coupling property) after layout, and does not generate more uniform physical properties because different numbers of data lines pass through the layout areas occupied by different pixel sensing units.

In order to make the aforementioned and other objectives and advantages of the present invention comprehensible, embodiments accompanied with figures are described in detail below.

DESCRIPTION OF THE EMBODIMENTS

Figure 1:
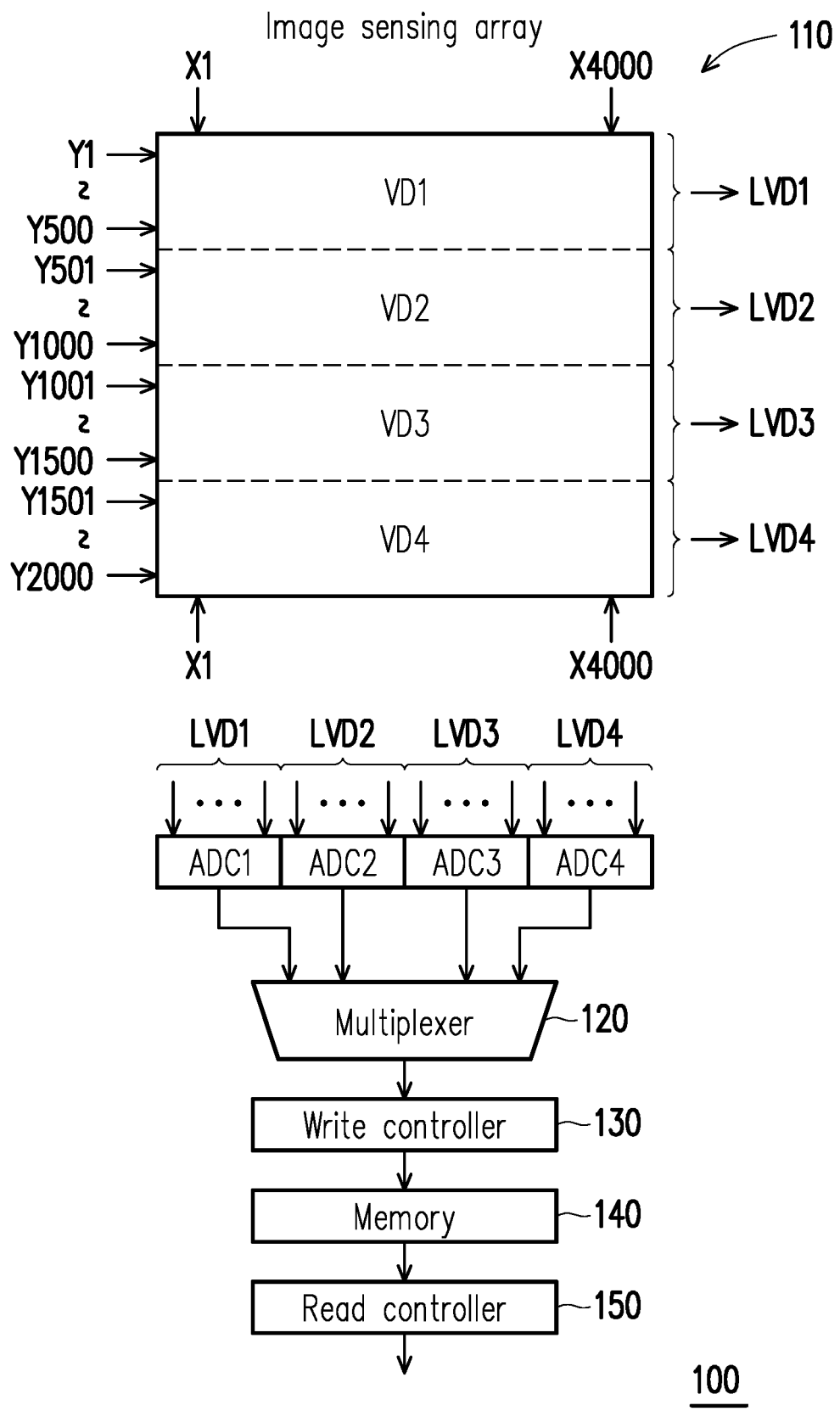
FIG. 1 is a block diagram of an image sensing device according to an embodiment of the present disclosure.

FIG. 1 is a block diagram of an image sensing device 100 according to an embodiment of the present disclosure. The image sensing device 100 mainly comprises an image sensing array 110, multiple analog-to-digital converters (ADCs) ADC1 to ADC4, a multiplexer 120, a write controller 130, a memory 140, and a read controller 150. The image sensing device 100 according to the embodiment can be applied to an information system or electronic device related to image capturing, such as a high-resolution monitoring device, a security system, a mobile phone, a vehicle device and AI image recognition device. The memory 140 may also be referred to as a frame buffer, and may be performed by a dynamic random access memory, a cache memory, and the like.

The image sensing array 110 can be performed by a CMOS pixel array. The image sensing array 110 comprises multiple pixel sensing units arranged into rows and columns. The pixel sensing unit may be composed of a photodiode and multiple transistors. The resolution of the image sensing array 110 and the number of pixel arrangements can be set according to the requirements by those who apply the embodiment. The image sensing array 110 can be comparable to the currently used video format in resolution, and can also use the scan sequence of the above video format, such as progressive scan/interlaced scan, to capture the image. The resolution of the image sensing array 110 according to the embodiment can also be self-defined by the user. For example, the video format presented by 4000×2000 pixels is used as the resolution in the image sensing array 110 of the image sensing device 100 in the embodiment. That is to say, the image sensing array 110 has 2000 scanning lines (labeled as a scanning line Y1 to a scanning line Y2000 sequentially). Each scanning line has 4000 pixel sensing units, and the pixel values sensed by these pixel sensing units are labeled as a pixel X1 to a pixel X4000 sequentially.

Various elements (the image sensing array 110, the analog-to-digital converters ADC1 to ADC4, the multiplexer 120, the write controller 130, the memory 140, and the read controller 150) in the image sensing device 100 may be integrated into the same one or more integrated circuits by using a back side illumination (BSI) process, so that the wiring area of a circuit board can be saved, and the work efficiency of these elements is improved.

On the other hand, in order to improve the work efficiency of the image sensing array 110 in capturing images, and to obtain more scanning line working time for each of the pixel sensing units in the image sensing array, the image sensing array 110 in the embodiment is divided into multiple pixel capturing areas. The pixel capturing area is generated by dividing the scanning lines Y1 to Y200 of the image sensing array 110 by N, and N is a positive integer. It is assumed here that N is 4, so the number of pixel capturing areas is equal to 4, for example, the 4 pixel capturing areas VD1 to VD4 are presented in FIG. 1. The scanning lines of the pixel capturing areas VD1 to VD4 are the same in length, that is, the lengths of the scanning lines are all 4000 pixels. The number of the scanning lines in each of the pixel capturing areas VD1 to VD4 is a value obtained by dividing 2000 by 4 (that is, "500"). In other words, the pixel capturing area VD1 is composed of the scanning lines Y1 to Y500; the pixel capturing area VD2 is composed of scanning lines Y501 to Y1000; the pixel capturing area VD3 is composed of scanning lines Y1001 to Y1500; and the pixel capturing area VD4 is composed of scanning line Y1501 to Y2000. In other embodiments in accordance with the embodiments of the present disclosure, the number N of the pixel capturing areas may be any positive integer 2, 3, 4 and 5 etc. In other embodiments in accordance with the embodiments of the present disclosure, the numbers of the scanning lines of the pixel capturing areas are not necessarily the same. For example, when the above N is 3 and the image sensing array 110 has 2000 scanning lines, the first two pixel capturing areas can have 667 scanning lines, and the last pixel capturing area has 666 scanning lines. The multiple pixel capturing areas in the embodiment are divided from the same image sensing array, and it is not that different image sensing arrays are integrated together, so there is no boundary effect between the pixel capturing areas, and there is no need to deal with the situations such as "image stitching".

When the image sensing array 110 captures an image, the pixel capturing areas VD1 to VD4 will acquire multiple analog pixel data sequentially at the same time. For convenience of explanation, hereinafter, each pixel data is represented as (Xa, Yb), that is, the pixel data (Xa, Yb) represents the pixel data of a pixel Xa on the scanning line Yb, where a is a natural number from 1 to 4000, and b is a natural number from 1 to 2000. Multiple data lines of corresponding pixel capturing units in the pixel capturing areas VD1 to VD4 are respectively labeled as data line groups LVD1, LVD2, LVD3, and LVD4. In the embodiment of the present disclosure, each analog pixel data is a 10-bit as an example, so the analog-to-digital converters ADC1 to ADC4 can convert a 10-bit signal each time. The multiplexer 120 obtains the 10-bit signal from the analog-to-digital converters ADC1 to ADC4 respectively and the multiplexer 120 is controlled by the write controller 130 to arrange the four 10-bit signals sequentially. In other embodiments, each analog pixel data may also be realized by a 8-bit, and those who apply the present disclosure are not limited thereto.

Herein, how the pixel capturing areas VD1 to VD4 acquire multiple analog pixel data sequentially at the same time is illustrated. At the first time point of capturing the frame, the pixel capturing area VD1 obtains the analog pixel data (X1, Y1) at the uppermost left corner thereof, and at the same time, the pixel capturing area VD2 obtains the analog pixel data (X1, Y501) at the uppermost left corner thereof, the pixel capturing area VD3 obtains the analog pixel data (X1, Y1001) at the uppermost left corner thereof, and the pixel capturing area VD4 obtains the analog pixel data (X1, Y1501) at the uppermost left corner thereof. At the second time point of capturing the frame, the pixel capturing area VD1 obtains the analog pixel data (X2, Y1) at the uppermost left corner thereof, and at the same time, the pixel capturing area VD2 obtains the analog pixel data (X2, Y501) at the uppermost left corner thereof, the pixel capturing area VD3 obtains the analog pixel data (X2, Y1001) at the uppermost left corner thereof, and the pixel capturing area VD4 obtains the analog pixel data (X2, Y1501) at the uppermost left corner thereof, and so on, until after all the pixels on the scanning lines Y1, Y501, Y1001, and Y1501 acquire the analog pixel data, the pixel capturing areas VD1 to VD4 turn to the next scanning lines Y2, Y502, Y1002, and Y1502 at the same time to obtain the analog pixel data of these scanning lines, until all the analog pixel data in the pixel capturing area VD1 to VD4 are acquired. After the analog pixel data in some pixel capturing units in the pixel capturing areas VD1 to VD4 are acquired, these pixel capturing units perform a reset operation and successively perform pixel sensing of the next frame. That is, the pixel capturing areas VD1 to VD4 acquire the analog pixel data of pixel sensing units of these scanning lines from the first scanning lines (e.g., the scanning line Y1 of the pixel capturing area VD1, the scanning line Y501 of the pixel capturing area VD2, the scanning line Y1001 of the pixel capturing area VD3, and the scanning line Y1501 of the pixel capturing area VD4) to the last scanning lines in positive sequence (e.g., the scanning line Y500 of the pixel capturing area VD1, the scanning line Y1000 of the pixel capturing area VD2, the scanning line Y1500 of the pixel capturing area VD3, and the scanning line Y2000 of the pixel capturing area VD4). This scan sequence can also be referred to as Z-type progressive scan.

The analog-to-digital converters ADC1, ADC2, ADC3, and ADC4 are coupled to the corresponding pixel capturing areas VD1, VD2, VD3, and VD4, respectively, to receive the data line groups LVD1, LVD2, LVD3, and LVD4, and convert the analog pixel data sensed by the pixel capturing areas VD1, VD2, VD3, and VD4 into multiple digital pixel data. For example, at the above first time point, the analog-to-digital converters ADC1, ADC2, ADC3, and ADC4 receive the analog pixel data (X1, Y1), (X1, Y501), (X1, Y1001), and (X1, Y1501), respectively and simultaneously, and convert these analog pixel data into the digital pixel data (X1, Y1), (X1, Y501), (X1, Y1001) and (X1, Y1501), and so on. For example, at the above second time point, the analog-to-digital converters ADC1, ADC2, ADC3, and ADC4 receive the analog pixel data (X2, Y1), (X2, Y501), (X2, Y1001), and (X2, Y1501), respectively and simultaneously, and convert these analog pixel data into the digital pixel data (X2, Y1), (X2, Y501), (X2, Y1001) and (X2, Y1501).

The multiplexer 120 is coupled to the output ends of the analog-to-digital converters ADC1 to ADC4. Each input end of the multiplexer 120 is a 10-bit data, and the output end thereof is also a 10-bit data. The write controller 130 is coupled to the multiplexer 120, the memory 140 is coupled to the write controller 130, and the read controller 150 is coupled to the memory 140.

The write controller 130 can control the multiplexer 120 to receive the digital pixel data. In detail, the write controller 130 controls the multiplexer 120 to adjust the sequence of the digital pixel data obtained from the analog-to-digital converters ADC1, ADC2, ADC3, and ADC4 at the same time point to receive the digital pixel data generated by the analog-to-digital converters ADC1 to ADC4 from the multiplexer 120, and the write controller 130 writes these digital pixel data to the memory 140 according to the first pixel arrangement related to the digital pixel data. For example, at the above first time point, the four input ends of the multiplexer 120 respectively receive the digital pixel data (X1, Y1), (X1, Y501), (X1, Y1001), and (X1, Y1501), and the write controller 130 controls the multiplexer 120 to receive the digital pixel data (X1, Y1), (X1, Y501), (X1, Y1001), and (X1, Y1501) sequentially from the analog-to-digital converters ADC1, ADC2, ADC3, and ADC4. Herein, the pixel arrangement of the digital pixel data (X1, Y1), (X1, Y501), (X1, Y1001), and (X1, Y1501) is referred to as a part of the first pixel arrangement. Moreover, the write controller 130 writes these digital pixel data formed by the first pixel arrangement to the corresponding positions of the memory 140 sequentially according to the continuous address of the memory 140. Thereby, the write controller 130 writes the digital pixel data to the memory 140 by using the first pixel arrangement of the digital pixel data.

Herein, the "first pixel arrangement" of the digital pixel data is exemplified by the above description of the embodiment. The sequence of the "first pixel arrangement" is as follows: digital pixel data (X1, Y1), (X1, Y501), (X1, Y1001), and (X1, Y1501), digital pixel data (X2, Y1), (X2, Y501), (X2, Y1001), and (X2, Y1501), . . . , and so on to digital pixel data (X4000, Y1), (X4000, Y501), (X4000, Y1001), and (X4000, Y1501) acquired at the same time by the first scanning lines in the pixel capturing areas VD1 to VD4, and so on to the digital pixel data acquired at the same time by the next scanning lines in the pixel capturing areas VD1 to VD4, that is, the digital pixel data (X1, Y2), (X1, Y502), (X1, Y1002), and (X1, Y1502) . . . digital pixel data (X4000, Y2), (X4000, Y502), (X4000, Y1002), and (X4000, Y1502) . . . up to the digital pixel data acquired at the same time by the last scanning lines in the pixel capturing areas VD1 to VD4, that is, the digital pixel data (X1, Y500), (X1, Y1000), (X1, Y1500), and (X1, Y2000) . . . and the digital pixel data (X4000, Y500), (X4000, Y1000), (X4000, Y1500), and (X4000, Y2000).

The read controller 150 reads the digital pixel data in the memory 140 according to the second pixel arrangement related to the video format, and the read controller 150 integrates these digital pixel data, thereby generating a video signal of the video format. In detail, the read controller 150 uses the first pixel arrangement as a position index of the digital pixel data, and then arranges these digital pixel data sequentially according to the second pixel arrangement related to the required video format. Then, as long as these digital pixel data arranged in the required video format are slightly sorted, for example, information such as the header of the video signal and system parameters is added, the video signal of the required video format can be generated in real time.

In the embodiment, the video format presented by 4000× 2000 pixels is used as the required video format, and the second pixel arrangement related to the required video format performs the pixel arrangement in a way that the scanning lines perform scanning sequentially. Herein, the "second pixel arrangement" related to the required video format is exemplified by the above description of the embodiment. The sequence of the "second pixel arrangement" is as follows: digital pixel data (X1, Y1), (X2, Y1) . . . and (X4000, Y1) positioned on the scanning line Y1, digital pixel data (X1, Y2), (X2, Y2) . . . and (X4000, Y2) positioned on the scanning line Y2 . . . up to the digital pixel data (X1, Y2000), (X2, Y2000) . . . and (X4000, Y2000) positioned on the scanning line Y2000.

In other words, the first pixel arrangement adopted by the write controller 130 is not the same as the second pixel arrangement adopted by the read controller 150. The first pixel arrangement is based on the digital pixel data acquired at the same time by the scanning lines in the pixel capturing areas VD1 to VD4; the second pixel arrangement is to scan each of the pixels in the scanning lines sequentially as required by the video format as the pixel arrangement basis. Although the two are not the same, the read controller 150 can still use the first pixel arrangement adopted by the write controller 130 as the position index of the digital pixel data, and find out the corresponding address of the required digital pixel data in the memory 100 by means of a list and a lookup table, so that the read controller 150 adjusts the sequence of arrangement of these digital pixel data while reading these digital pixel data. In this way, these digital pixel data can quickly generate a video signal of the specific video format according to the pixel arrangement related to the video format, without performing complicated analog-digital signal conversion, for example, the digital pixel data do not need to be adjusted again by using devices such as "pixel sequence rearrangement" and "video encoding".

Figure 2:
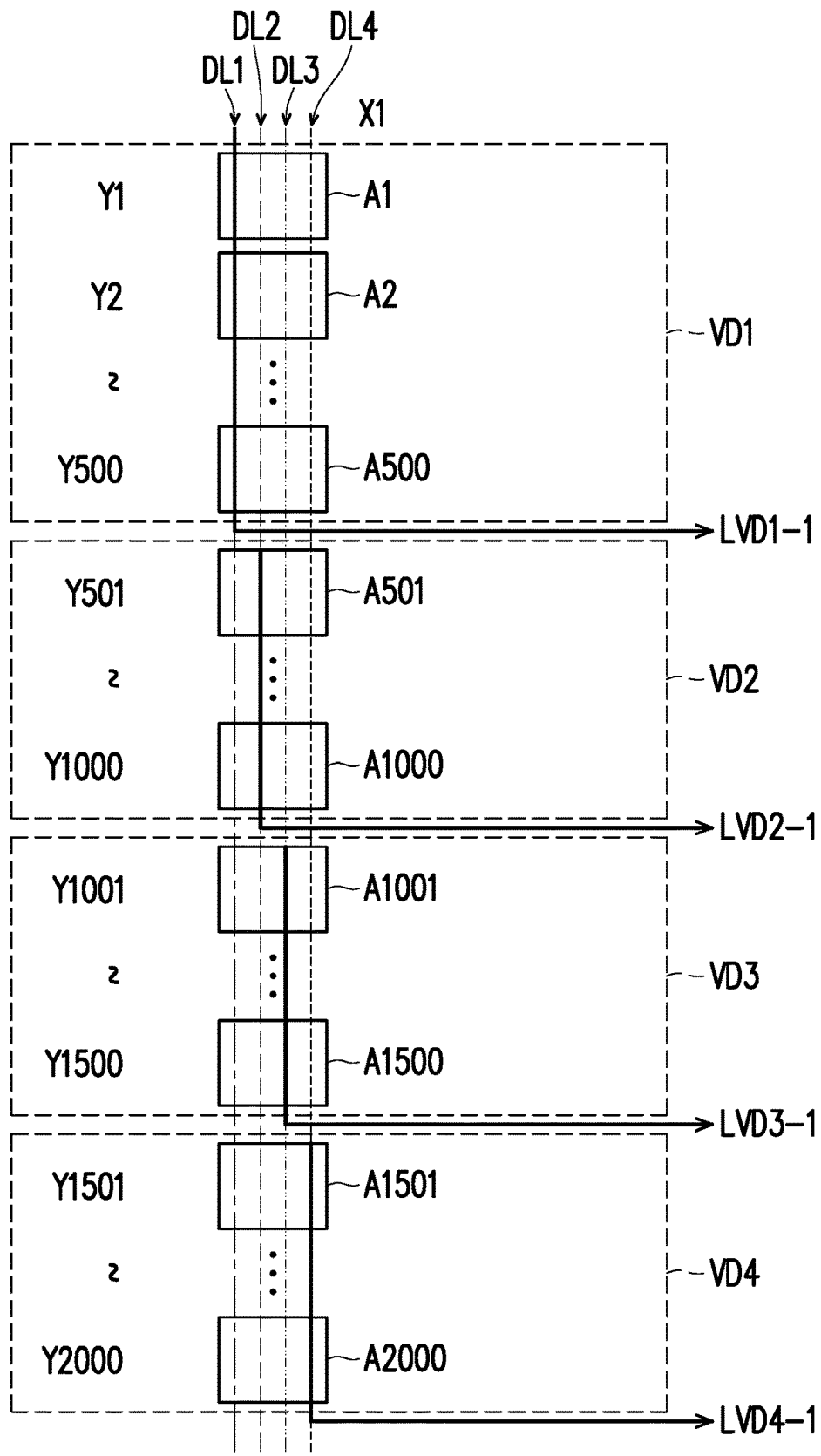
FIG. 2 is a flow chart of an image sensing method according to an embodiment of the present disclosure.

Furthermore, the data lines of which the number is equal to the number of pixel capturing areas (e.g., "4") are designed in the layout area occupied by each of the pixel sensing units in the embodiment. FIG. 2 is a schematic diagram showing the layout of part of the image sensing units of the image sensing array 110 in FIG. 1. As can be seen from FIG. 2, the image sensing array 110 comprises multiple pixel sensing units and multiple data lines. FIG. 2 shows only the layout areas of the pixel sensing units corresponding to the pixel X1 on the scanning lines Y1, Y2, Y500, Y501, Y1000, Y1001, Y1500, Y1501, and Y2000 as an example, and those who apply the embodiment can extend the application of the embodiment according to the description. The scanning lines Y1, Y2 to Y500 are located in the pixel capturing area VD1; the scanning lines Y501 to Y1000 are located in the pixel capturing area VD2; the scanning lines Y1001 to Y1500 are located in the pixel capturing area VD3; and the scanning lines Y1501 to Y2000 are located in the pixel capturing area VD4. The layout area occupied by each of the pixel sensing units comprises N data lines, for example, 4 data lines.

In the prior art, since the pixels at the same position in each scanning line do not read data at the same time, these pixels are electrically coupled to the same data line, thereby obtaining the analog pixel data of these pixels by using the data line. In the embodiment of the present disclosure, the pixel capturing areas VD1 to VD4 can read the pixels at the same position in each scanning line at the same time, so the layout area occupied by each of the pixel sensing units comprises the data lines of which the number is equal to the number ("4") of the pixel capturing areas.

For example, the layout areas of the pixel sensing units corresponding to the pixel X1 on the scanning lines Y1, Y2 to Y500, Y501 to Y1000, Y1001 to Y1500, and Y1501 to Y2000 are respectively labeled as A1, A2 to A500, A501 to A1000, A1001 to A1500, and A1501 to A2000 in FIG. 2. There are 4 data lines located on these layout areas, namely, DL1, DL2, DL3 and DL4. The data lines DL1, DL2, DL3, and DL4 are respectively coupled to the data line LVD1-1 in the data line group LVD1, the data line LVD2-1 in the data line group LVD2, the data line LVD3-1 in the data line group LVD3, and the data line LVD4-1 in the data line group LVD4. The layout layer where the data lines DL1 to DL4 are located may be different from the layout layer where the pixel sensing unit is located.

The data line DL1 in the data lines DL1 to DL4 is electrically coupled to the data ends of the pixel sensing units in the layout areas A1, A2 to A500; the data line DL2 is electrically coupled to the data ends of the pixel sensing units in the layout areas A501 to A1000; the data line DL3 is electrically coupled to the data ends of the pixel sensing units in the layout areas A1001 to A1500; and the data line DL4 is electrically coupled to the data ends of the pixel sensing units in the layout areas A1501 to A2000. Relatively, the data lines DL2 to DL4 are not electrically coupled to the data ends of the pixel sensing units in the layout areas A1, A2 to A500; the data lines DL1, DL3 to DL4 are not electrically coupled to the data ends of the pixel sensing units in the layout areas A501 to A1000; the data lines DL1 to DL2, DL4 are not electrically coupled to the data ends of the pixel sensing units in the layout areas A1001 to A1500; and the data lines DL1 to DL3 are not electrically coupled to the data ends of the pixel sensing units in the layout areas A1501 to A2000.

In other words, although only one of the data lines DL1 to DL4 is connected to the layout area of the corresponding pixel sensing unit, the data line not connected to the pixel sensing unit floats in the air above the layout area of the pixel sensing unit. In this way, each of the pixel sensing units is similar in physical properties (e.g., capacitive coupling property) after layout, and does not generate different physical properties because different numbers of data lines pass through the layout areas occupied by different pixel sensing units.

In another embodiment of the present disclosure, the image sensing array 110 in the image sensing device 100 is divided into multiple pixel capturing areas (e.g., VD1 to VD4 in FIG. 1). In the embodiment of the present disclosure, each of the pixel capturing areas VD1 to VD4 acquires multiple analog pixel data sequentially at the same time, and therefore, when the frame captured by the image sensing device 100 is a dynamic frame with a large moving speed, the frame has a fracture feeling because each of the pixel capturing areas VD1 to VD4 captures the analog pixel data at the same time. In other words, the objects in the frame may be misaligned, fractured, etc. at the stitching positions of the adjacent pixel capturing areas VD1 to VD4, resulting in poor feeling of watching the video signals. In order to avoid the above situation, in the embodiment of the present disclosure, the adjacent pixel capturing areas (e.g., the pixel capturing areas VD1 to VD4 of FIG. 1) acquire the analog pixel data in different sequences, and FIG. 3 below is used to explain.

Figure 3:
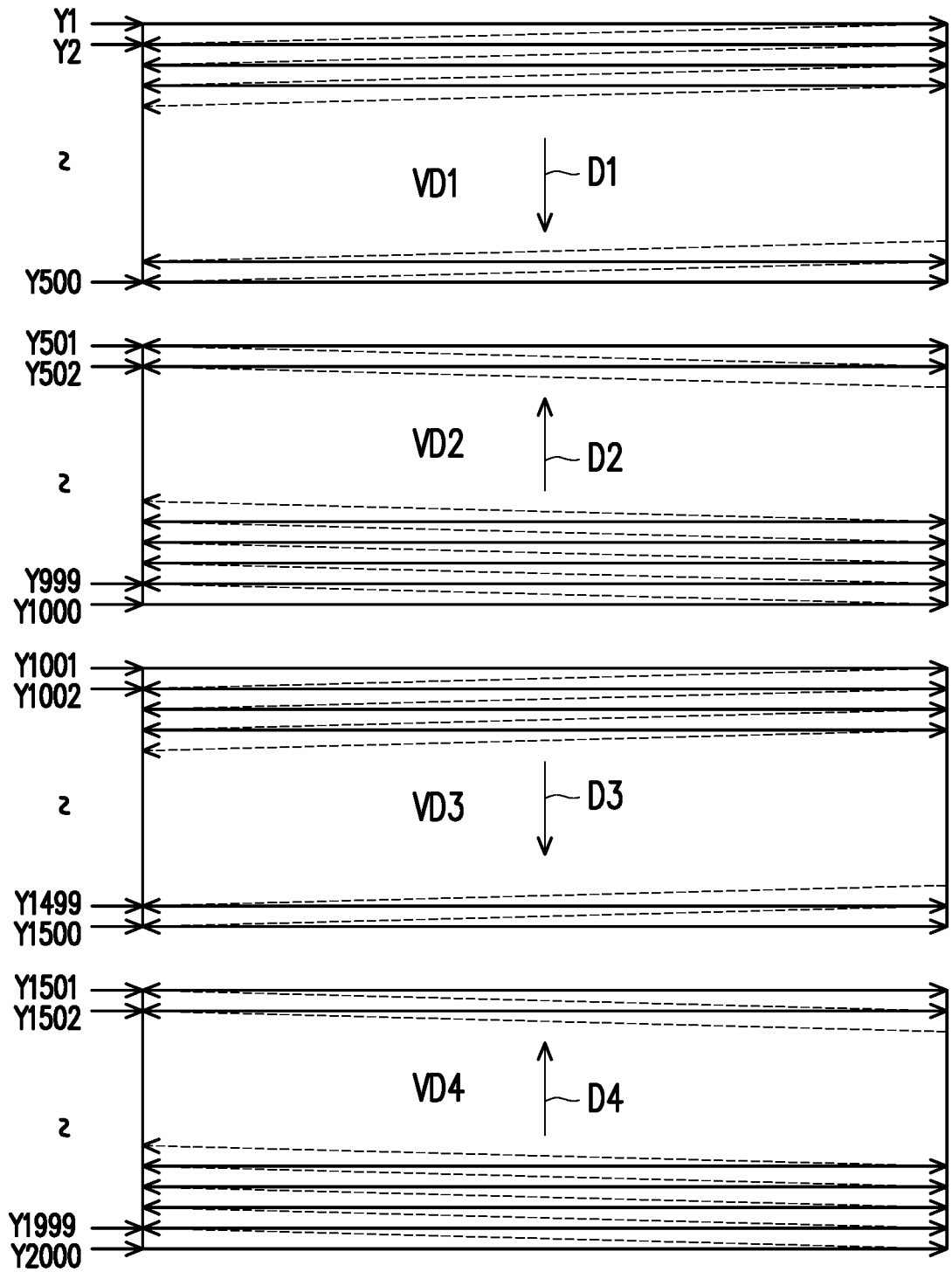
FIG. 3 is a schematic diagram of multiple pixel capturing areas in an image sensing array and an acquisition sequence of analog pixel data adopted by the multiple pixel capturing areas according to another embodiment of the present disclosure.

FIG. 3 is a schematic diagram of multiple pixel capturing areas VD1 to VD4 in the image sensing array 110 and an acquisition sequence of analog pixel data used by the multiple pixel capturing areas according to another embodiment of the present disclosure. In the embodiment, the adjacent pixel capturing areas (e.g., the pixel capturing areas VD1 to VD4 of FIG. 1) acquire the analog pixel data in different sequences, that is, odd pixel capturing areas VD1 and VD3 of the pixel capturing areas VD1 to VD4 acquire the analog pixel data of corresponding pixel sensing units from the first scanning lines (e.g., the scanning line Y1 in the pixel capturing area VD1, and the scanning line Y1001 in the pixel capturing area VD3) to the last scanning lines (e.g., the scanning line Y500 in the pixel capturing area VD1, and the scanning line Y1500 in the pixel capturing area VD3) in a positive sequence (corresponding to a first sequence); even pixel capturing areas VD2 and VD4 of the pixel capturing areas VD1 to VD4 acquire the analog pixel data of corresponding pixel sensing units from the last scanning lines (e.g., the scanning line Y1000 in the pixel capturing area VD2, and the scanning line Y2000 in the pixel capturing area VD4) to the first scanning lines (e.g., the scanning line Y501 in the pixel capturing area VD2, and the scanning line Y1501 in the pixel capturing area VD4) in a reverse sequence (corresponding to a second sequence). From another point of view, the odd pixel capturing areas VD1 and VD3 use Z-type progressive scan, and the even pixel capturing areas VD2 and VD4 use reverse Z-type progressive scan. Herein, the positive sequence and the reverse sequence are respectively used as the first sequence and the second sequence as an example, and the first sequence and the second sequence are mutually reversed. Those who apply the embodiment can adjust according to the requirements, for example, the reverse sequence is used as the first sequence, and the positive sequence is used as the second sequence.

The pixel capturing area VD1 adopts Z-type progressive scan (shown by an arrow D1 in FIG. 3) to acquire the analog pixel data sequentially from the scanning lines Y1, Y2, ..., to Y500; the pixel capturing area VD2 adopts inverse Z-type progressive scan (shown by an arrow D2 in FIG. 3) to acquire the analog pixel data sequentially from the scanning lines Y1000, Y999, ... Y502, to Y501; the pixel capturing area VD3 adopts Z-type progressive scan (shown by an arrow D3 in FIG. 3) to acquire the analog pixel data sequentially from the scanning lines Y1001, Y1002, ..., Y1499, to Y1500; the pixel capturing area VD4 adopts inverse Z-type progressive scan (shown by an arrow D4 in FIG. 3) to acquire the analog pixel data sequentially from the scanning lines Y2000, Y1999, ... Y1502, to Y1501.

In this way, since the scanning line Y1000 in the pixel capturing area VD2 and the scanning line Y1001 in the pixel capturing area VD3 will capture the analog pixel data at the same time, the difference in pixel working time of the image sensing elements at the pixel capturing area VD2 and VD3 stitching part is eliminated, so that the frame at the stitching part is smoother due to the configuration of the scanning sequence, thereby reducing the fracture feeling of the frame.

Figure 4:
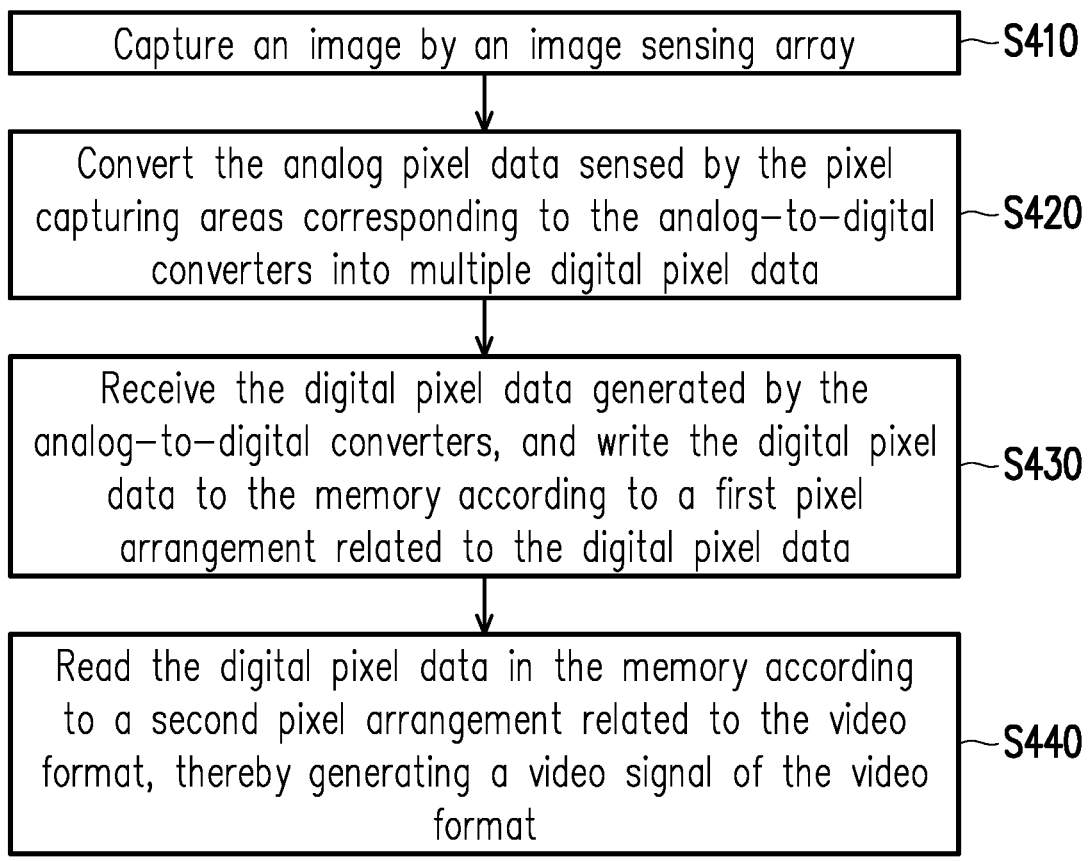
FIG. 4 is a flow chart of an image sensing method according to an embodiment of the present disclosure.

FIG. 4 is a flow chart of an image sensing method according to an embodiment of the present disclosure. The image sensing method is applicable to the image sensing device 100 in FIG. 1. Referring to FIG. 4, in S410, an image is captured by the image sensing array 110 of FIG. 1. The image sensing array 110 is divided into multiple pixel capturing areas VD1 to VD4, and the scanning lines of each of the pixel capturing areas VD1 to VD4 are the same in length, and each of the pixel capturing areas VD1 to VD4 acquires multiple analog pixel data sequentially at the same time. In S420, the analog pixel data sensed by the pixel capturing areas VD1 to VD4 corresponding to the analog-to-digital converters ADC1 to ADC4 are converted into multiple digital pixel data by the multiple analog-to-digital converters ADC1 to ADC4. In S430, the digital pixel data generated by the analog-to-digital converters ADC1 to ADC4 are received, and these digital pixel data are written to the memory 140 according to the first pixel arrangement related to these digital pixel data. The memory 140 temporarily stores and buffers these digital pixel data. In S440, the digital pixel data in the memory 140 is read according to the second pixel arrangement related to the video format, thereby generating a video signal of the video format. For other detailed descriptions of the image sensing method, please refer to the above embodiment.

In summary, the image sensing device and the image sensing method according to the embodiments of the present disclosure simultaneously perform signal conversion by using multiple pixel capturing areas and corresponding multiple analog-to-digital converters so that the pixel data is in a digital form, thereby improving the work efficiency and enabling each of the pixel sensing units in the image sensing array to obtain more working time. Moreover, when reading the digital pixel data from the memory, the embodiment directly adopts the pixel arrangements related to the video format. In this way, these digital pixel data can quickly generate the video signal of the specific video format according to the pixel arrangement related to the video format, without performing complicated analog-digital signal conversion, for example, the digital pixel data does not need to be adjusted again by using devices such as "pixel sequence rearrangement" and "video encoding". Furthermore, in the embodiment, the data lines of which the number is equal to the number of pixel capturing areas are designed in the layout area occupied by each of the pixel sensing units, and only one of the data lines is connected to the corresponding pixel sensing unit, but each of the pixel sensing units is similar in physical properties (e.g., capacitive coupling property) after layout, and does not generate different physical properties because different numbers of data lines pass through the layout areas occupied by different pixel sensing units. Moreover, by adjusting the acquisition sequence of the analog pixel data of the adjacent pixel capturing areas, the frame at the stitching part between the pixel capturing areas is smoother due to the configuration of the scanning sequence, thereby reducing the fracture feeling of the frame.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. An image sensing device, comprising:
   an image sensing array, the image sensing array being divided into a plurality of pixel capturing areas, scanning lines of each of the pixel capturing areas being the same in length, and each of the pixel capturing areas acquiring a plurality of analog pixel data sequentially at the same time;
   a plurality of analog-to-digital converters, each of the analog-to-digital converters being coupled to each of the corresponding pixel capturing areas to convert analog pixel data sensed from the corresponding pixel capturing areas into a plurality of digital pixel data;

a multiplexer, coupled to output ends of the analog-to-digital converters;

a write controller, coupled to the multiplexer;

a memory, coupled to the write controller and the memory temporarily stores and buffers the digital pixel data; and a read controller, coupled to the memory, wherein the write controller receives the digital pixel data generated by the analog-to-digital converters from the multiplexer, and writes the digital pixel data to the memory according to a first pixel arrangement related to the digital pixel data, and, the read controller reads the digital pixel data in the memory according to a second pixel arrangement related to a video format, thereby generating a video signal of the video format.

2. The image sensing device according to claim 1, wherein the read controller uses the first pixel arrangement as a position index of the digital pixel data, and arranges the digital pixel data sequentially according to the second pixel arrangement related to the video format to generate the video signal of the video format.

3. The image sensing device according to claim 1, wherein the image sensing array, the analog-to-digital converters, the multiplexer, the write controller, the memory, and the read controller are integrated into the same one or more integrated circuits by using a back side illumination (BSI) process.

4. The image sensing device according to claim 1, wherein the pixel capturing area is generated by dividing the scanning lines of the image sensing array by N, the number of the pixel capturing areas is equal to N, and N is a positive integer.

5. The image sensing device according to claim 4, wherein the video format is a video format presented by 4000×2000 pixels, and the number of scanning lines in each of the pixel capturing areas is a value obtained by dividing 2000 by N.

6. The image sensing device according to claim 4, wherein the image sensing array comprises a plurality of pixel sensing units and a plurality of data lines, a layout area occupied by each of the pixel sensing units comprises N data lines, a first data line of the N data lines is electrically coupled to a first pixel sensing unit among the pixel sensing units, and data lines of the N data lines other than the first data line are not electrically coupled to the first pixel sensing unit.

7. An image sensing method, comprising:

capturing an image by the image sensing array, wherein the image sensing array is divided into a plurality of pixel capturing areas, scanning line of each of the pixel capturing areas are the same in length, and each of the pixel capturing areas acquires a plurality of analog pixel data sequentially at the same time;

converting the analog pixel data sensed by the pixel capturing areas corresponding to a plurality of analog-to-digital converters into a plurality of digital pixel data by the analog-to-digital converters;

receiving the digital pixel data generated by the analog-to-digital converters, and writing the digital pixel data to the memory according to the first pixel arrangement related to the digital pixel data; and reading the digital pixel data in the memory according to a second pixel arrangement related to a video format, thereby generating a video signal of the video format.

8. The image sensing method according to claim 7, wherein generating the video signal of the video format comprises the following steps:

using the first pixel arrangement as a position index of the digital pixel data, and arranging the digital pixel data sequentially according to the second pixel arrangement related to the video format to generate the video signal of the video format.

9. The image sensing method according to claim 7, wherein the pixel capturing area is generated by dividing the scanning lines of the image sensing array by N, the number of the pixel capturing areas is equal to N, and N is a positive integer.

10. The image sensing method according to claim 9, wherein the image sensing array comprises a plurality of pixel sensing units and a plurality of data lines, a layout area occupied by each of the pixel sensing units comprises N data lines, a first data line of the N data lines is electrically coupled to a first pixel sensing unit among the pixel sensing units, and data lines of the N data lines other than the first data line are not electrically coupled to the first pixel sensing unit.

11. An image sensing device, comprising:

an image sensing array, the image sensing array being divided into a plurality of pixel capturing areas, scanning lines of each of the pixel capturing areas being the same in length, and each of the pixel capturing areas acquiring a plurality of analog pixel data sequentially at the same time;

a plurality of analog-to-digital converters, each of the analog-to-digital converters being coupled to each of the corresponding pixel capturing areas to convert the analog pixel data sensed from the corresponding pixel capturing areas into a plurality of digital pixel data;

a multiplexer, coupled to the output ends of the analog-to-digital converters;

a write controller, coupled to the multiplexer, and the write controller controls the multiplexer to receive the data pixel data;

a memory, coupled to the write controller, wherein the write controller temporarily stores and buffers the digital pixel data by the memory; and a read controller, coupled to the memory, and the read controller integrates the digital pixel data in the memory into the video signal, wherein the pixel capturing areas, which are adjacent, acquire the analog pixel data in different sequences.

12. The image sensing device according to claim 11, wherein each of the pixel capturing areas comprises a plurality of scanning lines, each of the scanning lines comprises a plurality of pixel sensing units, odd pixel capturing areas in the pixel capturing areas acquire the analog pixel data from the first scanning lines to the last scanning lines arranged in a first sequence, and even pixel capturing areas in the pixel capturing areas acquire the analog pixel data from the last scanning lines to the first scanning lines arranged in a second sequence, wherein the first sequence and the second sequence are mutually reversed.

* * * * *